United States Patent [19]

Kotera et al.

[11] 3,880,834
[45] Apr. 29, 1975

[54] 1-METHYLAZIRIDINE COMPOUNDS AND PRODUCTION THEREOF

[75] Inventors: Katsumi Kotera, Osaka; Katsumi Hirose, Hyogo, both of Japan

[73] Assignee: Shionogi & Co., Ltd., Osaka, Japan

[22] Filed: Sept. 1, 1972

[21] Appl. No.: 285,665

[30] Foreign Application Priority Data
Sept. 10, 1971 Japan................................ 46-70185

[52] U.S. Cl............................ 260/239 E; 424/244
[51] Int. Cl............................................. C07d 23/06
[58] Field of Search ................................ 260/239 E

[56] References Cited
UNITED STATES PATENTS
3,586,666   6/1971   Kitahonoki...................... 260/239 E OTHER PUBLICATIONS
M. Sidman, Science, 118, 157–158 (1953), Q1534.

Primary Examiner—Alton D. Rollins
Assistant Examiner—Mark L. Berch
Attorney, Agent, or Firm—Wenderoth, Lind & Ponack

[57] ABSTRACT

1-Methylaziridine compounds represented by the formula:

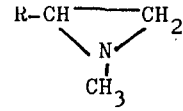

wherein R represents 5-indanyl, 1,2,3,4-tetrahydro-2-naphthyl, 5,6,7,8,-tetrahydro-2-naphthyl, or 3,4-xylyl, being useful as psychotropic agents, are prepared via two routes:

1. reacting an aminoethanol compound represented by the formula:

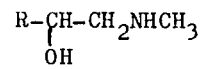

wherein R is as defined above with a halogenating agent or a sulfatizing agent and treating the resulting N-methyl-halogeno-ethylamine or methylaminoethyl hydrogen sulfate with an alkali (Route A);

2. reducing an oxime compound represented by the formula:

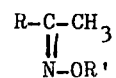

wherein R' represents a hydrogen atom or an acyl group and R' is as defined above and treating the resultant azirdine compound with a methylating agent (Route B).

1 Claim, No Drawings

1-METHYLAZIRIDINE COMPOUNDS AND PRODUCTION THEREOF

The present invention relates to 1-methylaziridine compounds and production thereof. More particularly, this invention relates to 1-methylaziridine compounds being useful as psychotropic agents, and production thereof.

The 1-methylaziridine compounds are represented by the formula:

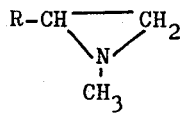  (I)

wherein R represents 5-indanyl, 1,2,3,4-tetrahydro-2-naphthyl, 5,6,7,8-tetrahydro-2-naphthyl, or 3,4-xylyl.

Accordingly, a basic object of the present invention is to embody 1-methylaziridine compounds (I). Another object of this invention is to embody 1-methylaziridine compounds (I) useful as psychotropic agents. A further object of the invention is to embody a process for preparing 1-methylaziridine compounds (I). These and other objects will be apparent to those conversant with the appurtenant art from the following description of the general class of compounds and the several specific examples and methods of obtaining them presented.

According to the present invention, the 1-methylaziridine compounds (I) can be prepared by two routes:

1. reacting an aminoethanol compound represented by the formula:

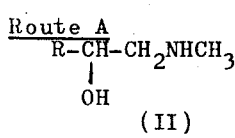  (II)

wherein R is as defined above with a halogenating agent or a sulfatizing agent to give an intermediate represented by the formula:

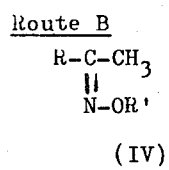  (III)

wherein X represents a halogen atom (e.g. chlorine, bromine) or a hydrogen sulfato group (—O—SO₃H) and R is as defined above and treating the intermediate with an alkali (Route A):

2. reducing an oxime compound represented by the formula:

  (IV)

wherein R represents 5-indanyl, 1,2,3,4-tetrahydro-2-naphthyl, 5,6,7,8-tetrahydro-2-naphthyl, or 3,4-xylyl and R' represents a hydrogen atom or an acyl group (e.g. acetyl, benzoyl) with an aluminum hydride complex to give an intermediate represented by the formula:

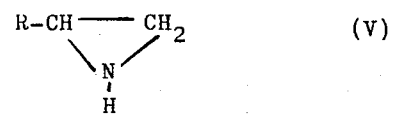  (V)

wherein R is as defined above and treating the intermediate with a methylating agent (Route B).

The process of the present invention is represented by the following scheme:

Route A
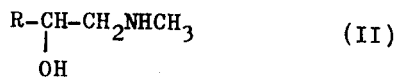

Route B
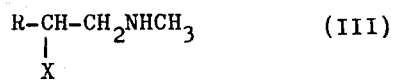

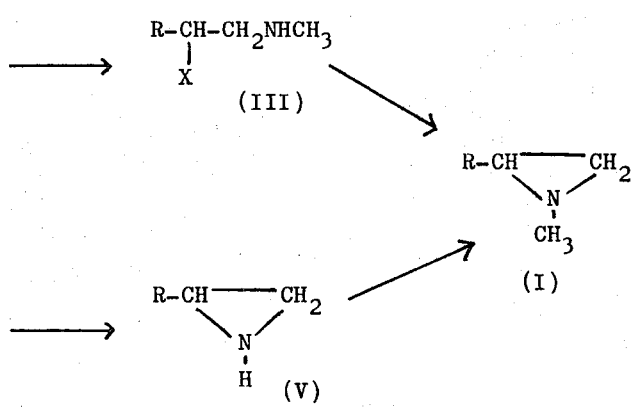

wherein R, R' and X are each as defined above.

Route A

The starting aminoalcohol compound (II) can be prepared by treating the corresponding oxirane or halogenoethanol compound with methylamine. The halogenation may be favorably effected in the presence or absence of an inert solvent (e.g. benzene, carbon tetrachloride, chloroform, dioxane, diglyme, tetrahydrofuran, their mixture) in the range of temperature from 0°C to the boiling point of the solvent used or that of the halogenating agent. Examples of the halogenating agent are phosphorus trichloride, phosphorus oxychloride, thionyl chloride, phosphorus pentachloride, phosphorus tribromide, and phosphorus pentabromide. The treatment of the starting aminoalcohol compound (II) with a sulfatizing agent may be favorably effected with cooling or heating in the presence or absence of an inert solvent (e.g. water). Examples of the sulfatizing agent are chlorosulfonic acid, methyl sulfate, and sulfuric acid. The thus-obtained intermediate (III) is then treated with an alkaline substance to make an aziridine ring. Examples of the alkaline substance are an inorganic base (e.g. ammonium hydroxide, sodium hydroxide, barium hydroxide, potassium methoxide, potassium carbonate, silver oxide), and an organic base (e.g. triethylamine, diethylaniline, pyridine). This reaction may be ordinarily carried out in an inert solvent (e.g. water, methanol, ethanol acetone, chloroform, benzene, ether, their mixture) with heating.

Route B

The starting oxime compound (IV) can be prepared, for example, by reacting a corresponding methyl ketone compound with hydroxylamine. This route is firstly carried out by reducing the said oxime compound (IV) with an aluminum hydride complex (e.g. lithium aluminum hydride, potassium aluminum hydride). The reduction may be ordinarily effected at room temperature or with heating in an inert solvent (e.g. dioxane, digylme, tetrahydrofuran, tetrahydropyran), favorably in the presence of an amine compound (e.g. diethylamine, N-methyl, N-propylamine, n-butylamine, triethylamine) for acceleration of the reaction rate. The reaction mixture is treated with a small amount of water in a conventional manner to give the aziridine intermediate (V). The intermediate (V) is then treated with a methylating agent, whereby the objective 1-methylaziridine compound (I) is obtained. Examples of the methylating agent are a methyl halide (e.g. methyl iodide, methyl bromide), and an oxonium methylating agent (e.g. trimethyloxonium fluoroborate, trimethyloxonium tetrachloroaurate, trimethyloxonium picrate). This reaction may be carried out at 0° to 100°C in an inert solvent (e.g. diglyme, monoglyme, tetrahydrofuran, ether, dioxane). For example, the treatment with a methylhalide is carried out in the presence of an alkali such as inorganic base (e.g. sodium hydroxide, ammonium hydroxide, barium hydroxide, potassium carbonate) or organic base (e.g. triethylamine, triethylenediamine, dimethylaniline, pyridine). After the treatment with an oxonium methylating agent, the produced quaternary salt is treated with a base (e.g. lithium aluminum hydride, sodium ethoxide, potassium carbonate).

The thus-obtained 1-methylaziridine compounds (I) are useful as psychotropic agents (e.g. tranquilizer, anti-depressant). Pharmacological activities of these compounds are shown in the following table.

TABLE

| Test Compound | Rotarod* performance | Catalepsy** | Sidman*** avoidance |
|---|---|---|---|
| Chlorpromazine | 1.65 | 4.4 | 0.68 |
| 1-Methyl-2-(5-indanyl)aziridine | 10.6 | 5.4 | 0.8 |
| 1-Methyl-2-(5,6,7,8-tetrahydro-2-naphthyl)aziridine | 11.3 | 5.4 | 0.58 |
| 1-Methyl-2-(3,4-xylyl)aziridine | 17.2 | >50 | 0.96 |

Note:
*Rotarod performance test was carried out on mice. A trained mouse was placed on a smooth wooden rod (3 cm in diameter) turning at 5 rotations per minute, after subcutaneous administration of a test compound, and the activity of the compound was evaluated according to whether the treated mouse fell from the rod within 2 minutes or not. The result is represented by $ED_{50}$ mg/kg. [Dunham, et al.: J. Am. Pharma. Assoc. 46, 208–209 (1957)].
**Catalepsy was observed by administering a test compound subcutaneously to rats, examining 120 minutes later the extent of catalepsy over 30 seconds while keeping rat's legs on three corks, and the result is represented by $ED_{50}$ mg/kg. [Winth, et al.: Arch. int. Pharmacody. 115, 1-31 (1958)].
***Sidman avoidance was observed by administering a test compound subcutaneously to rats and examining Sidman's avoidance, and it is represented by $ED_{50}$ mg/kg. [Sidman: Science, 118, 157–158 (1953)].

Further, acute toxicity ($LD_{50}$) of these compounds are as follows: 1-methyl-2-(5-indanyl)aziridine, 202.8 mg/kg; 1-methyl-2(5,6,7,8-tetrahydro-2-naphthyl)aziridine, 125 mg/kg; 1-methyl-2-(3,4-xylyl)aziridine, 186.1 mg/kg, each by subcutaneous administration to mice.

Note: Acute toxicity ($LD_{50}$) was determined as follows: A test compound was applied subcutaneously to mice in different single doses. For each dose 10 mice were used, their weight ranging from 15 to 17 grams. The mice were observed for 24 hours after the administration of the compound. The $Ld_{50}$ was calculated by graphic interpolation from two doses actually used, one of which killed less than half and the other more than half the number of mice treated (Schleicher and Schull probability graphic paper 268½ was used for the graphic interpolation). Accordingly, 1-methylaziridine compounds (I) exhibit excellent tranquilizing activity with lower unfavorable effects (e.g. extrapyramidal symptoms, muscle relaxation, dizziness) in comparison with chlorpromazine. Still, 1-methyl-2-(1,2,3,4-tetrahydro-2-naphthyl)aziridine shows a very slight monoamine oxidase inhibition but a long-acting and marked psychomotor stimulation in comparison with a known monoamine oxidase inhibitor, iproniazid.

The 1-methylaziridine compounds (I) may be administered in combination with pharmaceutically acceptable carriers, the choice of which is determined by the preferred route of administration, the solubility of the substance and standard pharmaceutical practice. Examples of pharmaceutical preparations are capsules, suspensions, tablets, and solutions.

The compositions containing the 1-methylaziridine compounds (I) may be dispensed in dosage unit forms for a single daily therapeutic dose or in smaller units for multiple doses or in larger units for division into single doses. In general, the dosage of these substances is of approximately the same order of magnitude as that of chlorpromazine. These substances are useful to treat the type of psychoneurosis.

Presently-preferred and practical embodiments of the present invention are illustratively shown in the following examples.

EXAMPLE 1 a. To a suspension of lithium aluminum hydride (1.7 g) in anhydrous tetrahydrofuran (50 ml), diethylamine (3.27 g) is added dropwise with cooling and stirring for 30 minutes. A solution of 2-acetyl-1,2,3,4-tetrahydronaphthalene oxime (2.1 g) in anhydrous tetrahydrofuran (20 ml) is added thereto, and the resultant mixture is refluxed for 2 hours. After cooling, the reaction mixture is mixed with a small amount of water, and filtered. The filtrate is dried over anhydrous potassium carbonate and evaporated to give a yellow oil (1.9 g). The oil is chromatographed on a column of silica gel (30 g) containing water (10 %). The benzene eluate affords 2-(1,2,3,4-tetrahydro-2-naphthyl)aziridine (836 mg) as an oil, which is treated with p-nitrobenzoyl chloride to give 1-p-nitrobenzoyl-2-(1,2,3,4-tetrahydro-2-naphthyl)aziridine as crystals melting at 109 to 111°C.

b. To a solution of 2-(1,2,3,4-tetrahydro-2-naphthyl)aziridine (6.4 g) in anhydrous ether (200 ml), methyl iodide (20 g) and potassium carbonate (60 g) are added thereto, and the resultant mixture is stirred at room temperature for 3 days. The reaction mixture is filtered, and the filtrate is evaporated. The residue is chromatographed on a column of silica gel (120 g) containing water (10 %). The benzene eluate affords 1-methyl-2-(1,2,3,4-tetrahydro-2-naphthyl)-aziridine (1.371 g) as an oil boiling at 150°C/2 mm Hg.

EXAMPLE 2 a. To a solution of 1-(5-indanyl)-2-methylaminoethanol (1.5 g) in chloroform (30 ml), thionyl chloride (1.1 g) is added dropwise with cooling and stirring. The precipitated crystals are filtered and recrystallized from methanol/acetone to give N-methyl-2-chloro-2-(5-indanyl)ethylamine hydrochloride (1.831 g) as crystals melting at 196°C (decomp.).

b. To a solution of the N-methyl-2-chloro-2-(5-indanyl)ethylamine hydrochloride (2.437g) in a small amount of methanol, 5 % potassium hydroxide-methanol solution (100 ml) is added, and the resultant mixture is refluxed for 1 hour. The reaction mixture is evaporated, and the residue is mixed with water and shaken with ether. The ethereal layer is washed with water, dried over anhydrous potassium carbonate, and evaporated. The residue is distilled to give 1-methyl-2-(5-indanyl)aziridine (1.366 g) as a distillate boiling at 90°C/1 mm Hg.

EXAMPLE 3 a. To a solution of 1-(5,6,7,8-tetrahydro-2-naphthyl)-2-methylaminoethanol (20 g) in chloroform (200 ml), thionyl chloride (16 g) is added dropwise with cooling and stirring in 30 minutes, and the resultant mixture is stirred at room temperature for 2 hours. The reaction mixture is concentrated under reduced pressure, and the residue is combined with acetone. The precipitated crystals are filtered and recrystallized from methanol/acetone to give N-methyl-2-chloro-2-(5,6,7,8-tetrahydro-2-naphthyl)ethylamine hydrochloride (17 g).

b. The above-obtained N-methyl-2-chloro-2-(5,6,7,8-tetrahydro-2-naphthyl)ethylamine hydrochloride (8 g) is mixed with 5 % potassium hydroxide-methanol (200 ml), and the resultant mixture is refluxed for 2 hours. The reaction mixture is evaporated to remove the solvent, and the residue is shaken with ether. The ether layer is washed with water, dried over anhydrous potassium carbonate and evaporated to remove the ether. The residue is distilled under reduced pressure to give 1-methyl-2-(5,6,7,8-tetrahydro-2-naphthyl)-aziridine (4.2 g) as an oil boiling at 95 to 100°C/0.1 mm Hg.

EXAMPLE 4 a. To a suspension of 1-(5,6,7,8-tetrahydro-2-naphthyl)-2-methylaminoethanol (1 g) in water (10 ml), conc. sulfuric acid (500 mg) is added dropwise with ice cooling and stirring, and the resultant mixture is heated at 128°C (bath temperature) for 2 hours. The reaction mixture is evaporated under reduced pressure, whereby 1-(5,6,7,8-tetrahydro-2-naphthyl)-2-methylaminoethyl hydrogen sulfate (1.26 g) is obtained as a light yellow oil.

b. To a solution of the above-obtained 1-(5,6,7,8-tetrahydro-2-naphthyl)-2-methylaminoethyl hydrogen sulfate (1.26 g) in water (8 ml), a solution of sodium hydroxide (1 g) in water (5 ml) is added with ice cooling, and the resultant mixture is heated with a boiling bath for 30 minutes. The reaction mixture is shaken with chloroform, washed with water, dried over anhydrous potassium carbonate, and evaporated to remove the chloroform. The residue is distilled under reduced pressure to give 1-methyl-2-(5,6,7,8-tetrahydro-2-naphthyl)-aziridine (683 mg) as an oil boiling at 95° to 100°C/0.1 mm Hg.

EXAMPLE 5 a. Similarly as in Example 1a, 2-acetyl-5,6,7,8-tetrahydronaphthalene oxime (2.0 g) is treated with lithium aluminum hydride (1.6 g) in tetrahydrofuran, whereby 2-(5,6,7,8-tetrahydro-2-naphthyl)aziridine (1.2 g) is obtained as a colorless oil boiling at 135° to 136°C/5 mm Hg. This substance is treated with p-nitrobenzoyl chloride to give 1-(p-nitrobenzoyl)-2-(5,6,7,8-tetrahydro-2-naphthyl)aziridine as crystals melting at 111° to 112°C.

b. To a solution of trimethyloxonium fluoroborate (220 mg) in monoglyme (3ml), a solution of 2-(5,6,7,8-tetrahydro-2-naphthyl)aziridine (170 mg) in monoglyme (3 ml) is added with ice cooling and stirring, and the resultant mixture is stirred at 0°C for 30 minutes. The reaction mixture is added gradually to a suspension of lithium aluminum hydride (300 mg) in monoglyme (2 ml) cooled with a bath of dry ice/acetone and the mixture is stirred at 0°C for 2 hours, stirred at room temperature for 1 hour, diluted with ether, mixed with a small amount of water under ice cooling, and filtered. The filtrate is evaporated under reduced pressure, and the residue is distilled to give 1-methyl-2-(5,6,7,8-tetrahydro-2-naphthyl)aziridine (85 mg) as an oil boiling at 95° to 100°C/0.1 mm Hg.

EXAMPLE 6 a. To a solution of 1-(3,4-xylyl)-2-methylaminoethanol (19.5 g) in chloroform (200 ml), a solution of thionyl chloride (17 g) in chloroform (85 mg) is added dropwise, and the resultant mixture is stirred at room temperature for 2 hours. The reaction mixture is evaporated under reduced pressure, and the residue is recrystallized from ethanol to give N-methyl-2-chloro-2-(3,4-xylyl)ethylamine hydrochloride (16 g) as crystals melting at 182° to 183°C (decomp.).

b. A solution of N-methyl-2-chloro-2-(3,4-xylyl)-ethylamine (16 g) in 5 % potassium hydroxide-methanol solution (200 ml) is refluxed for 1.5 hours. The reaction mixture is evaporated under reduced pressure to remove the solvent. The residue is combined with water and shaken with ether. The ether layer is washed with water, dried over anhydrous sodium sulfate, and evaporated. The residue is distilled under reduced pressure to give 1-methyl-(3,4-xylyl)aziridine (8.7 g) as a distillate boiling at 85° to 86°C/4 mm Hg.

EXAMPLE 7 a. 1-Methyl-2-(1,2,3,4-tetrahydro-2-naphthyl)-aziridine (0.5 g) is dissolved in purified sesame oil to give a solution (100 ml). The solution is filtered aseptically with a membrane filter (pore size: below 0.22 μ), sterilized and poured into 50 ampoules (volume, 2 ml) in a nitrogen atmosphere, and the ampoules are sealed. Each ampoule contains 1-methyl-2-(1,2,3,4-tetrahydro-2-naphthyl)aziridine (10 mg) as an active ingredient.

EXAMPLE 8

To a solution of Nikkol HCO-60 (a trade mark of a surfactant, polyoxyethylene castor oil derivative, made by Nikko Chemicals Co., Ltd.) (10 g) in water for injection (80 ml), L-arginine (0.5 g) and sodium chloride (0.6 g) are added to give a solution. A solution of 1-methyl-2-(5-indanyl)aziridine (0.5 g) in ethanol (1 ml) is added dropwise thereto with stirring. The resultant mixture is adjusted with dilute hydrochloric acid to pH 9.5 and mixed with water for injection to make a solution (100 ml). The solution is filtered aseptically with a membrane filter (pore size: below 0.22μ), sterilized and poured into 50 ampoules (volume, 2 ml) in a nitrogen atmosphere, and the ampoules are sealed. Each ampoule contains 1-methyl-2-(5-indanyl)aziridine (10 mg) as an active ingredient.

EXAMPLE 9

1-Methyl-2-(5,6,7,8-tetrahydro-2-naphthyl)aziridine (4 g) is dissolved in purified sesame oil to give a solution (100 ml). The solution is sealed in 400 soft gelatin capsules so as to contain 0.25 ml of the solution in each capsule. The capsules are coated with an enteric film. Each ampoule contains 1-methyl-2-(5,6,7,8-tetrahydro-2-naphthyl)aziridine (10 mg) as an active ingredient.

What is claimed is:

1. The compound 1-methyl-2-(1,2,3,4-tetrahydronaphthyl)aziridine.

* * * * *